UNITED STATES PATENT OFFICE.

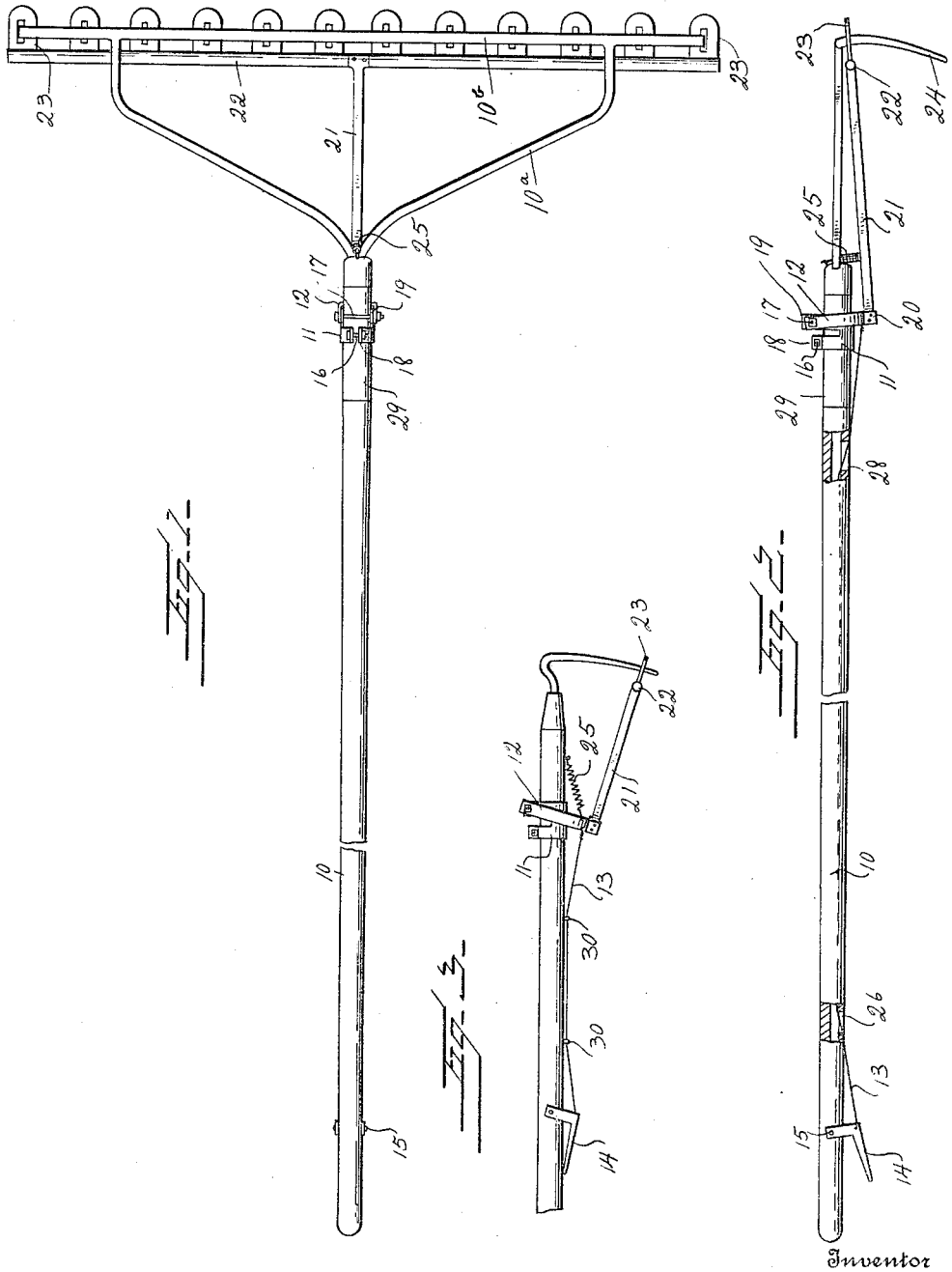

GEORGE F. PATTERSON, OF EDGERTON, MINNESOTA.

RAKE-CLEANER.

1,310,541. Specification of Letters Patent. Patented July 22, 1919.

Application filed February 10, 1919. Serial No. 276,067.

*To all whom it may concern:*

Be it known that I, GEORGE F. PATTERSON, a citizen of the United States, residing at Edgerton, in the county of Pipestone and State of Minnesota, have invented certain new and useful Improvements in Rake-Cleaners, of which the following is a specification, reference being had to the accompanying drawings.

This invention relates to rakes, and particularly to a cleaning attachment therefor whereby grass or other trash which may have accumulated upon the rake teeth may be cleaned therefrom.

One object of my invention is to provide a very simple, light, compact, and durable rake tooth cleaner of the character above referred to which may be easily manipulated and which will be thoroughly effective, but which will not interfere with the usual manner of using the rake.

Still another object is to provide a cleaning attachment which may be applied to rakes of the ordinary construction and which may be adjusted upon the handle of the rake to suit the length of the rake handle.

My invention is illustrated in the accompanying drawings, wherein:—

Figure 1 is a top plan view of a rake constructed in accordance with my invention;

Fig. 2 is a side elevation partly broken away; and

Fig. 3 is a side elevation of a modified form of rake and showing the cleaner depressed.

Referring to these drawings, 10 designates a rake handle which is illustrated as formed with a longitudinally extending passage, though, as illustrated in Fig. 3, this is not absolutely necessary. This handle has the usual diverging arms 10$^a$ supporting the usual transversely extending rake head 10$^b$ having downwardly extending teeth. Mounted upon the handle of the rake and preferably upon the ferrule or socket 29 is a clamp 11 which is U-shaped to partially embrace the rake handle and is split to form two pairs of arms 18 and 19. The arms 18 clamp upon the rake handle by means of a bolt 16 and the arms 19 support a forked lever 12 which is pivotally mounted upon the arms 19 by means of transverse bolts 17.

Riveted, bolted, or otherwise attached to the arms 12 at the point 20 is a forwardly extending rod 21 carrying a transversely extending bar 22 to which are attached a plurality of outwardly extending slotted ears 23, each of these ears being slotted for the passage of a corresponding rake tooth. For the purpose of causing the depression of these cleaning members 23, I provide a wire or other flexible connection 13 which is attached to the lower end of the lever 12 and which passes through an opening 28, then extends longitudinally through the passage of the handle 10, then out through an opening 26 and is connected to a hand lever 14 pivotally mounted upon the handle 10. For the purpose of retracting the cleaning members 23, that is raising them to the upper end of the rake teeth, I provide a coil contractile spring 25 atttached to the extremity of the handle 10 and to the bar 21.

In Fig. 3, I show a slight modification of the invention wherein the members 12, 21, 23 and 25 are of the same character as heretofore described, the lever 12 being mounted upon the clip or clamp 11 as heretofore described, and retracted by means of the spring 25, all as heretofore described. The only difference between the construction illustrated in Fig. 3 and that shown in Fig. 2, is that the wire 13 passes through eyes 30 attached to the exterior face of the rake and is then connected to the hand lever 14. By placing this wire 13 upon the exterior of the rake and guiding it through the eyes 30, it is possible to apply my attachment to any rake.

Furthermore, it will be seen that by shifting the clamp 11 along the rake, the device may be adjusted to suit any desired length of rake.

When grass or refuse has accumulated on the teeth of the rake, a slight pressure of the fingers will shift the lever 14, thereby shifting the lever 12 and causing the cleaning members to be depressed along the teeth, thus pushing off the grass or refuse. By releasing the lever 14, the spring 25 will retract the cleaning member to its initial position where it will be entirely out of the way of the rake teeth and not interfere with the usual use thereof.

Furthermore, if the rake has any tendency to dig into the soft ground and uproot the grass, the members 23 may be shifted down to their extreme position and this limits the depth to which the rake teeth may dig into the ground.

While I have illustrated a form of my invention which I believe to be particularly practical, yet it is obvious that many changes might be made without departing from the spirit of the invention as defined in the appended claim.

I claim:—

In a rake cleaner, the combination with a rake head having a plurality of teeth, of a handle fixed to the head, a ferrule fixed to the handle adjacent the head, a split clamp in surrounding relation and clamped to the ferrule, said clamp being constructed from a single piece of sheet metal and comprising pairs of arms from the opposite ends of the clamp, certain corresponding arms of both pairs fitting about the ferrule and provided with means to secure them together, to hold the clamp to the ferrule, certain other corresponding arms extending laterally in parallelism and tangentially to the periphery of the ferrule and being spaced, a pivot bolt extending through the ends of the latter arms, a U-shaped lever straddling the clamp and having its arms pivotally mounted upon the pivot bolt, a rod projecting at right angles from the arched portion of the lever, and toward the teeth of the rake head, a transversely extending bar carried by the extremity of the rod and provided with perforated ears through which the rake teeth pass, a contracting spring connecting said rod and a part of the extremity of the handle, the tension of which holds the bar and the ears in normal positions, and a hand lever pivotally attached to the handle and having an operative connection passing through the handle and connected to the U-shaped lever.

In testimony whereof I hereunto affix my signature in the presence of two witnesses.

GEORGE F. PATTERSON.

Witnesses:
J. G. McGLASHEN,
VIOLET M. RING.